United States Patent [11] 3,582,177

[72] Inventor Horst Kiemle
Pullach, Germany
[21] Appl. No. 750,992
[22] Filed Aug. 7, 1968
[45] Patented June 1, 1971
[73] Assignee Siemens Aktiengesellschaft
Berlin and Munich, Germany
[32] Priority Aug. 10, 1967
[33] Germany
[31] P1,572,836.6

[54] METHOD AND DEVICE FOR HOLOGRAPHICALLY PHOTOGRAPHING AND REPRODUCING OBJECTS
15 Claims, 5 Drawing Figs.

[52] U.S. Cl. .................................................. 350/3.5, 96/36.2
[51] Int. Cl. ............................................... G02b 27/22
[50] Field of Search ........................................ 350/3.5; 96/36.2

[56] References Cited
FOREIGN PATENTS
1,437,780  3/1966  France ........................ 350/3.5

OTHER REFERENCES
Paques et al., C.R. Acad. Sc. Paris, Vol. 260, pp. 6562— 6564 (6/1965)
Meier, J. Opt. Soc. Am., Vol. 55, No. 8, pp. 987— 991 (8/1965)
Rigler, J. Opt. Soc. Am., Vol. 55, No. 12, (12/1965)
Field, Electronic Design, pp. 17— 18 (6/1966)

*Primary Examiner*—David Schonberg
*Assistant Examiner*—Robert L. Sherman
*Attorneys*—Curt M. Avery, Arthur E. Wilfond, Herbert L. Lerner and Daniel J. Tick

ABSTRACT: Method and apparatus for holographically photographing an object and reproducing it from a hologram includes dividing either a reference beam or a reproducing beam, illuminating a hologram, respectively, when photographing or reproducing, into a given number of partial beams producing a like number of images of an object. The partial beams are actually distinct with respect to orientation of their excitation centers relative to the intersection point of the hologram with an optical axis perpendicular to the hologram surface to an extent corresponding to the mutual spatial disposition of the individual images of the photographed object in reproducing the hologram.

Fig.3a
Fig.3b
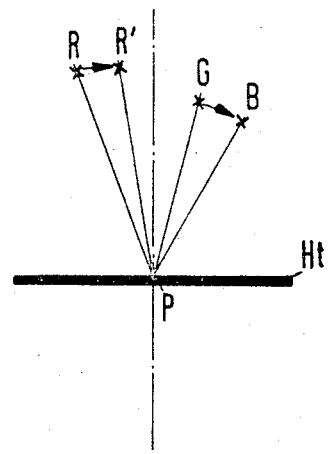
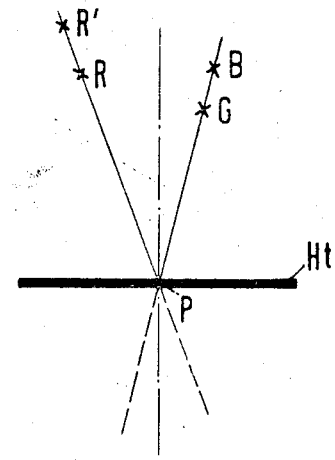
Fig.4
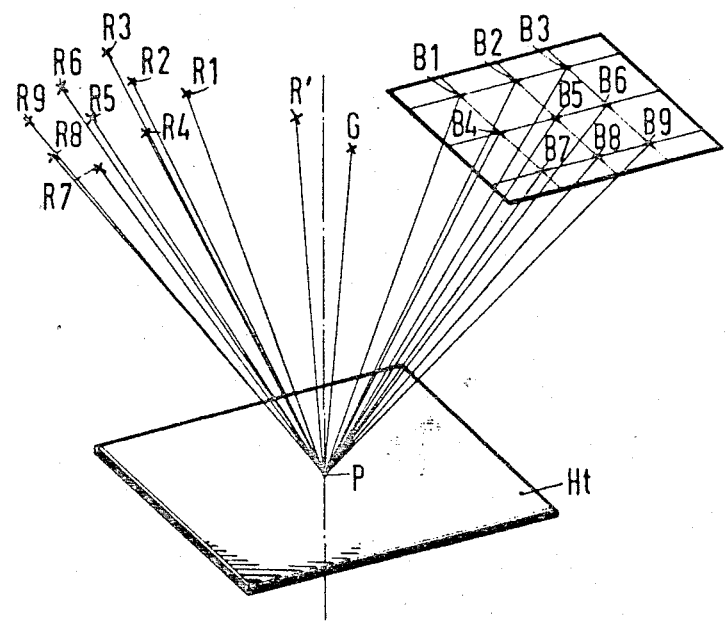

METHOD AND DEVICE FOR HOLOGRAPHICALLY PHOTOGRAPHING AND REPRODUCING OBJECTS

My invention relates to method and device for holographically photographing an object and reproducing the same from the hologram, preferably in the form of a real image.

Methods and devices of this general type are of significance particularly for contact-free projection of photoetching masks on photosensitive layers or films applied to semiconductor wafers, in the course of producing integrated circuits. The photoetching masks are produced in general photographically from an etch stencil cut on a suitably enlarged scale, the etch stencil being transposed into a diapositive reduced in size to that of the desired original. For reasons of efficiency and savings in material, several hundred identical etch masks are generally applied simultaneously and one above the other by displacing the photoplate from photograph to photograph a predetermined scanning distance opposite the reduced image of the etch stencil. The mechanical device required therefor, known as a repeater, must meet the highest standards of precision.

The etch masks of original size on the diapositive cannot be transposed to the photosensitive or photoresist layer by projection with lenses because an unavoidable, unbearable loss of resolution is produced due to the bending of the light rays at the edges of each objective lens. Consequently, the method of contact-copying must be employed here, whereby a diapositive is firmly pressed against the photoresist layer with the side thereof having a photographic emulsion thereon, and is irradiated with light. Besides the fact that the diapositive is unable to be brought into contact with the photoresist layer over the entire surface thereof and thereby losses in sharpness of definition or resolving power must be reckoned with, unavoidable damage to the diapositive occurs, when pressing the layers together and separating them, due to scratches and dust particles pressed therein, resulting in rejects among the components that are produced.

In the periodical "Electronic Design," June 21, 1966, pages 17 and 18 thereof, it has therefore been suggested that difficulties arising during a contact-copying or printing process for producing integrated circuits be avoided by substituting a process of holographic projection therefor. The latter process permits a contactless projection of the images of the etch masks on the photoresist layer. Moreover, holograms are insensitive to dust and small scratches.

By holography is meant the process of optically photographing and reproducing which is carried out with coherent light and which permits light waves emanating or reflecting from an illuminated object, in accordance with their amplitude and phase, to be photographed and accurately reproduced by employing interference phenomena. In the reproduction of objects photographed by this method, three-dimensional images of these objects are produced.

The photograph of a light wave in accordance with the amplitude and phase thereof reflected or emanating from an object illuminated with coherent light is known as a "hologram." This word comes from the Greek "holos" which means entire, i.e. all of the information regarding the object in the light wave necessary for reproducing the image of the object is stored in the photograph.

Features which are considered as characteristic for the invention are set forth in the appended claims.

Although the invention is illustrated and described herein as method and apparatus for holographically photographing and reproducing objects, it is nevertheless not intended to be limited to the details shown, since various modifications in the method and structural changes in the apparatus may be made without departing from the spirit of the invention and within the scope and range of equivalents of the claims.

The construction of the apparatus and the method of operation of the invention, however, together with the objects and advantages thereof, will be best understood from the following description of the prior art devices and of specific embodiments of the invention when read in connection with the accompanying drawings, wherein:

FIGS. 3a, 3b and 4 are diagrammatic views representing modifications in the method and apparatus of the invention in this application.

Figure 1:
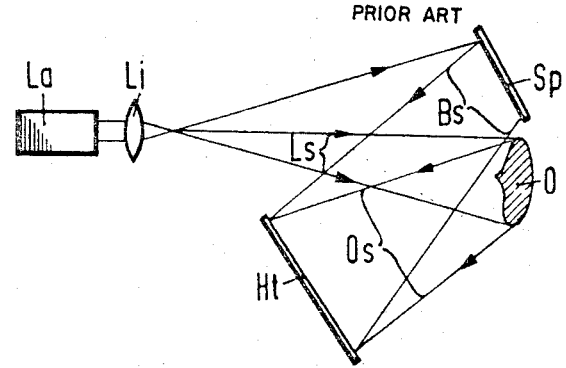
FIG. 1 is a schematic view of apparatus for holographically photographing an object according to the prior art.

In the production of a hologram according to the prior art, the object O as shown in FIG. 1, which is to be photographed, is illuminated by coherent and preferably monochromatic light produced by a laser $La$. The beam of light from the laser is shown as an illuminating beam $Ls$. The light reflected from the surface of the object impinges in the form of an object beam $Os$ on a hologram carrier $Ht$, a plate having a light-sensitive layer superimposed thereon such as, for example, a photographic plate. In the optical path of the laser light beam, is located above the object O a mirror $Sp$ which deflects the laser beam as a reference beam $Bs$ to the hologram carrier $Ht$. The laser $La$ is provided at the outlet end thereof with a converging lens $Li$ which gives a spherical wave geometry to the coherent light emerging in parallel out of the laser. Instead of the mirror $Sp$, which serves in the apparatus of FIG. 1 for deriving the reference beam $Bs$ from a light source common to the illuminating beam $Ls$ and the reference beam $Bs$, two separate light sources for the illuminating beam $Ls$ and the reference beam $Bs$, and coherent to one another, can be provided in a suitable apparatus.

The object beam $Os$ reflecting from the object O and the reference beam $Bs$ are superimposed at the location of the hologram carrier $Ht$. Due to the coherence characteristics of both light beams $Os$ and $Bs$, a stationary interference field is produced in the space in which both light beams overlap, i.e. at the location of the hologram carrier $Ht$. This interference field is represented by a dark-area distribution corresponding to the distribution of the intensity of the interference field over the surface of the light-sensitive layer of the hologram carrier $Ht$ after it has been illuminated and developed. The varied dark areas photographed on the hologram contain all the information necessary for reproducing the object beam in accordance with the amplitude and phase distribution thereof.

Figure 2:
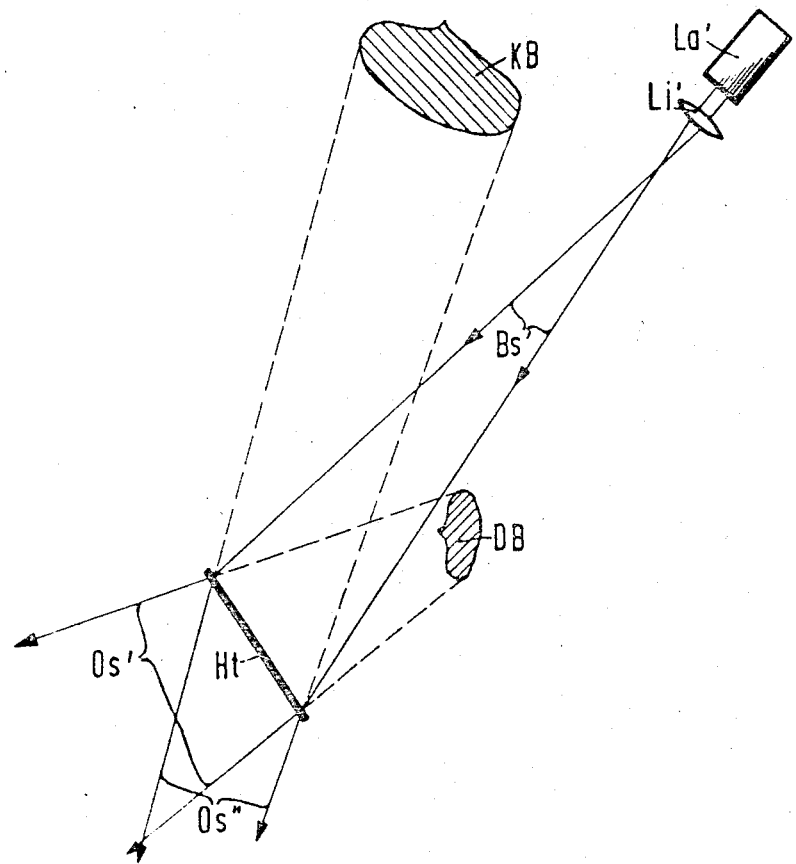
FIG. 2 is a schematic view of apparatus for reproducing a holographically photographed object also as known in the prior art.

When the hologram is illuminated with the reference beam $Bs$ according to FIG. 1, i.e. a coherent light beam with a wavelength and a spatial geometry corresponding to the light employed for the photography, the wave fronts reflected from the object when photographed are reproduced with true amplitude and phase. A suitable reproducing apparatus is shown in FIG. 2 wherein a laser $La'$ assembled with a converging lens $Li'$ located downstream thereof is employed as light source. A reproducing light beam $Bs'$ which produces a reproduction of the photographed object corresponds to the reference beam $Bs$ of FIG. 1. In general, the reproducing beam $Bs'$ produces two object waves $Os'$ and $Os''$, extending in different directions, which present to the viewer, depending upon his position with respect to the hologram, the object spatially true to the original as a direct image DB or as a conjugated image KB. In essence, only the direct virtual image DB, which appears to the viewer behind the hologram carrier $Ht$, is of interest.

The direct image DB is able to be produced as real image in front of the hologram carrier $Ht$ by illuminating the hologram carrier $Ht$ from the opposite direction by the reproducing beam $Bs'$ or, according to FIG. 2, from a direction turned through an angle of 180°. This real image is then obtainable for evaluation with a magnifying glass and microscope and can be projected on a surface. The real image thus obtained is free of any faults in the representation or reproduction thereof, in spite of their opposite directions of propagation or expansion, when the wave fronts of the reference beam $Bs'$ have the same curvature as that of the reproducing beam $Bs'$, which is technologically realizable only with difficulty and inaccurately.

In the holographic projection of etch masks, the image of the etch masks is obtained by reducing the etch stencil by means of a conventional optical system. It has been suggested heretofore, when photographing this reduced image of the etch stencil, to dispose the hologram carrier in the optical path of the optical system between the optical lens or lenses and the image. In this case, the hologram carrier need not be reversed when reproducing the image of the image of the photographed hologram, in order to obtain the real image. The same wave with the same direction of propagation can thus be used for both the reference and the reproducing beams without occurrence of faults in the representation or duplication of the image.

In the same manner as for the hereinbefore described method of contact-copying or printing by means of diapositives, it is possible also to produce an image raster of the reduced image of the etch stencil with the aid of a repeater during the photographing operation. The repeater displaces the hologram carrier from photograph to photograph in the direction of the desired raster relative to the image being photographed. This method is exceptionally time consuming and has the further disadvantage that the precision standards imposed on the repeater are not realizable to the degree that sources of trouble are excluded.

It is accordingly an object of my invention to provide a system for holographically projecting images of objects, particularly for holographically projecting etch masks of the aforedescribed type, which affords a simple solution for the production of a plurality of images located adjacent and/or above and below one another, that overcomes the aforedescribed difficulties incident to the use of the repeater.

With the foregoing and other object in view, I provide in accordance with my invention, method and apparatus for holographically photographing an object and reproducing the same from the resulting exposed hologram so as to obtain a plurality of images of an object located adjacent and/or above and below one another. I accordingly divide either a reference light beam illuminating a nonexposed hologram during the photographing operation or a reproducing light beam illuminating the exposed hologram during the reproducing operation into a given number of partial light beams for producing a number of images of an object corresponding to the given number of partial light beams. The partial light beams are distinguished from one another with respect to the orientation of their respective excitation centers relative to the intersection point of the hologram surface with an optical axis perpendicular to the hologram surface to an extend corresponding to the mutual spatial disposition of the individual images of the photographed object when reproducing the hologram.

In accordance with another important feature of my invention, the spatial position of the reconstructed image of a holographically photographed object is dependent in a defined manner upon the mutual spatial arrangement of the reference and reproducing beams. When a plurality of reference beams are employed during the photographing operation, each reference beam forms with the object beam an individual hologram. All of the individual holograms overlap one another or are mutually superimposed in the photosensitive layer of the hologram carrier. They consequently also furnish respectively an image of the photographed object by means of a single reproducing beam, during the reproducing operation. With suitably mutual, spatial orientation of the individual reference beams, spatially separated images of the one object are capable of reconstruction by means of the single reference beam, and in fact in practically every desired arrangement. The orientation of the excitation centers of the component reference beams is particularly able to be adjusted for a two-dimensional raster which results in a corresponding raster-multiple of the image of the photographed object when the hologram is being reproduced.

In accordance with another feature of the invention, the same effect is able to be achieved by working with only a single reference beam during the photographing operation while the reproducing operation is carried out with a corresponding multiple of component reproducing beams. It is also possible, and has no effect on the results, to bring the component beams of the multiple into action sequentially and not simultaneously.

In the aforementioned application of the invention for projecting etch masks in the production of semiconductors it is technologically advantageous to form the reference beam as a multiple of reference beams and to employ a simple wave as reproducing beam, because the required accuracy, in the formation of the raster of the excitation centers of the partial wave multiple must be realized only once when photographing the hologram, whereas the reproducing of the photographed image is possible repeatedly as desired and at relatively low cost.

With the holographic projection of etch masks according to the teaching of my invention, it is thus possible, in an extraordinarily advantageous manner, to omit the repeater yet produce the raster multiple of an etch mask on a hologram carrier, during the course of the photographing operation.

In addition there is also a more general significance added to the invention of the present application. Besides its use for holographic projection of images on photosensitive layers, the invention of the instant application can be applied in those cases where two or more images of the same photographed object are to be produced, i.e., for example in the application of holography in films, television advertising.

In a preferred application of the invention of the present application for contactless projection of an image, which is an image of an object reduced in size by a conventional optical system, the hologram carrier is disposed in the direction of the object beam between the optical system and the image. This arrangement permits the use of partial reference beams or partial reproducing beams with diverging spherical wave characteristics. In contrast to partial reference beams or partial reproducing beams with plane wave characteristics, it is possible here to arrange the excitation centers of the partial beams in a two-dimensional raster in a relatively simple manner so that in reproducing the hologram the image raster corresponding to the partial beams is disposed in a plane.

In accordance with further features of the system of my invention, the spatial arrangement between the reproducing beam or the partial reproducing beams and the hologram carrier does not correspond generally to the spatial mutual arrangement of the partial reference beams or the whole reference beams with respect to the hologram carrier when being photographed. Small errors in representation or copying of the reconstructed or reproduced raster images of the photographed object are therefore inherently present. However, the size of these errors or faults in representation or copying is able to be kept within negligibly small limits by means of skillful spatial orientation of the excitation centers of the partial reference beams with respect to the intersection point of the optical axis with the hologram carrier. In this case, it is advantageous to select the spacing of the excitation center of the reference beam or of the excitation centers of all of the partial reference beams, the spacing of the object to be photographed and the spacing of all the excitation centers of the partial reproducing beam or of the excitation center of the whole reproducing beam, respectively, from the intersection point of the optical axis with the hologram carrier, so that the respective spacing distances therebetween are essentially the same, For very great demands with respect to freedom from representation or copying errors, it is expedient to distort the partial reference beams in advance for the purpose of compensating the errors in representation or copying of the individual images corresponding thereto during the reproducing of the hologram, in a suitable manner, when necessary, by an auxiliary hologram disposed in the optical path of the partial reference beams.

In the embodiments of the invention disclosed in FIGS. 3a and 3b, there is shown a *reflection-type hologram carrier Ht* having an optical axis disposed perpendicularly to the surface of the hologram carrier Ht and represented in FIGS. 3a and 3b by a dot-dash line. As shown in these figures, an object G which is to be holographically photographed and reproduced in the aforedescribed manner is located above the hologram carrier Ht.

As extensive theoretical tests upon which the invention of the present application is based have proven, the following laws must apply for the location of the image point B when reproducing the hologram. For these laws, the spacing of the object G and the image point B from the intersecting point P of the optical axis in the plane of the hologram carrier Ht on the one hand, and the corresponding spacing of the excitation centers R of the reference beam and the excitation centers R' of the reproducing beam from the point P on the other hand, are determining factors. There must first be noted that, assuming that the same wave geometry exists between the reference beam and the reproducing beam, the image point B coincides with the object point G when the excitation center R' of the reproducing beam during the reproducing operation, coincides with the excitation center R of the reference beam during the photographing operation. If, as shown in FIG. 3a, the spacing of the excitation center R' of the reproducing beam from the point P is kept constant, i.e. the excitation center R' travels in a direction away from the excitation center R on a spherical plane from the excitation center R, then the spacing of the image point B from the point P also remains constant, and the image point B moves likewise on a spherical surface. If, on the other hand, the excitation center R' of the reproducing beam travels away from the excitation center R of the reference beam on a straight line extending between the excitation center R and the point P, then the image point B also travels away from the object point G solely in a straight line extending between the object point G and the point P.

Both of these representation or copying laws permit reproduction of the object point G by means of a single reproducing beam in an amount corresponding to a number of reference beams having excitation centers Ri which are spatially disposed in a predetermined manner and such reproduced images of the object G can be arranged in practically any desired manner.

In FIG. 4, such an arrangement is shown for nine reference beams having excitation centers R1—R9, thereby forming a two-dimensional raster and being spatially disposed in such a manner that the object point G produces with the aid of a reproducing beam having an excitation center R', an image raster of nine image points B1—B9, disposed in a plane. By employing partial reference beams and a reproducing beam with plane wave characteristics, all the excitation centers are disposed at infinity. This means that the excitation centers of the partial reference beams and of the reproducing beam all have the same spacing from the point P. The representation of an image raster in a plane according to FIG. 4 is consequently impossible in this case. The two-dimensional image raster always assumes a spherical surface in this case. This limitation does not, however, prevent the employment of the invention of the instant application in the holographic projection of etch masks because the radius of curvature of the spherical surface of the image raster can be selected so that it is sufficiently large enough and, furthermore, the surface covered by the image raster generally encompasses only a few square centimeters. If desired, the projection surface can also be accommodated or adjusted to the spherical surface of the image raster.

I claim:

1. System for holographically photographing an object and reproducing it from a resulting hologram comprising a hologram carrier having an optical axis disposed perpendicular thereto, means for illuminating said hologram carrier with reference light so as to produce a holographic photograph of an image of an object on said hologram carrier, and means for illuminating said holographic photograph with reproducing light for reproducing the image photographed on said hologram, at least one of said illuminating means including means for dividing a beam of the respective light into a given number of partial light beams having respective excitation centers spaced given respective distances from the point of intersection of said optical axis with the surface of said hologram carrier so as to produce a number of images of the object equal to said given number of partial light beams, said partial light beams being distinct from one another with respect to orientation of said excitation centers thereof relative to said point of intersection to an extent corresponding to mutual spatial disposition of said images.

2. Systems according to claim 1 wherein said partial light beams are comprised of a reference light beam adapted to form an image of the object in said hologram carrier in the course of a photographic operation.

3. System according to claim 1 wherein said partial light beams are comprised of a reproducing light beam adapted to form a real image, in the course of a reproducing operation, of an image of the object previously photographed on said hologram carrier.

4. System according to claim 1 wherein the images of the object are located above and below one another.

5. System according to claim 1 wherein the images of the object are located laterally adjacent one another.

6. System according to claim 1 wherein orientation of the excitation centers of said partial light beams is adjustable for a two-dimensional raster.

7. System according to claim 1 for contact-free projection of an image raster of a photographed object on a surface wherein the photographed object is an image of an object reduced in size by an optical system, and wherein said hologram carrier is disposed in direction of light beam extending from the object between said optical system and the image thereof.

8. System according to claim 1 wherein said partial light beams have a diverging spherical wave characteristic and, with respect to said excitation centers thereof, are arranged in a raster so that upon reproducing said hologram, an image raster corresponding to said partial light beams is disposed in a plane.

9. System according to claim 1 wherein the other of said illuminating means comprises a single light beam having an excitation center, said excitation center, the excitation centers of the respective partial light beams, and the object being photographed all being spaced the same distance from said point of intersection of said optical axis with said surface of said hologram carrier for producing minimal error in the reproduced image.

10. System according to claim 2, including an auxiliary hologram carrier disposed in the optical path of said partial reference light beams for distorting said beams in advance so as to compensate for errors in reproduction of said images in a subsequent reproducing operation.

11. System according to claim 1, wherein said one illuminating means is adapted to illuminate said hologram carrier sequentially with said partial beams.

12. Method of holographically photographing an object and reproducing it from a resulting hologram for producing a photoemulsion mask for semiconductors, which comprises locally illuminating with coherent reference light a photoemulsion layer applied to a carrier, acting as a hologram, developing the hologram, and locally illuminating the hologram with coherent reproducing light, and including dividing one of the illuminating lights into at least two partial light beams, and directing each of the partial light beams so as to produce a respective discrete illuminating structure on the photoemulsion layer.

13. Method according to claim 12, which includes disposing excitation centers of the partial light beams at locations spaced at different distances from a point of intersection of the surface of the hologram with an optical axis perpendicular thereto so that the discrete illuminating structures form a two-dimensional raster on the photoemulsion layer of the hologram.

14. Method according to claim 12, which includes producing the hologram corresponding to an image of desired mask geometry projected through a reducing optical system by placing the hologram carrier between the reducing optical system and the image produced thereby, when photographing the hologram.

15. Method according to claim 13, which includes employing partial light beams having a spherical wave characteristic, and geometrically disposing the excitation centers of the partial light beams in such a different manner that the image points finally received on the hologram are all disposed in a plane.